No. 807,630. PATENTED DEC. 19, 1905.
W. P. MEEKER.
APPARATUS FOR MAKING ARTICLES FROM PLASTIC MATERIAL.
APPLICATION FILED APR. 25, 1904.
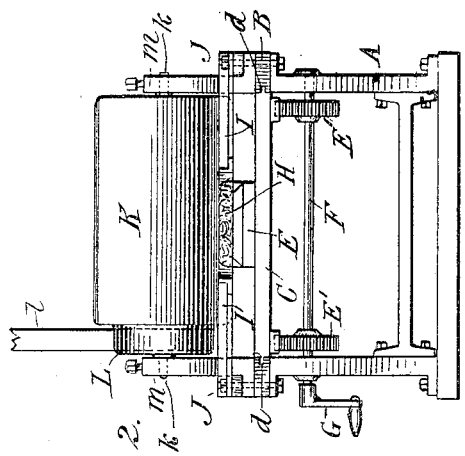
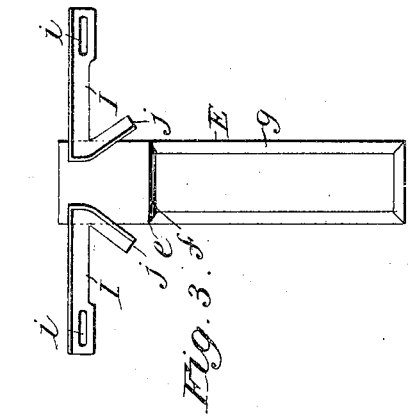
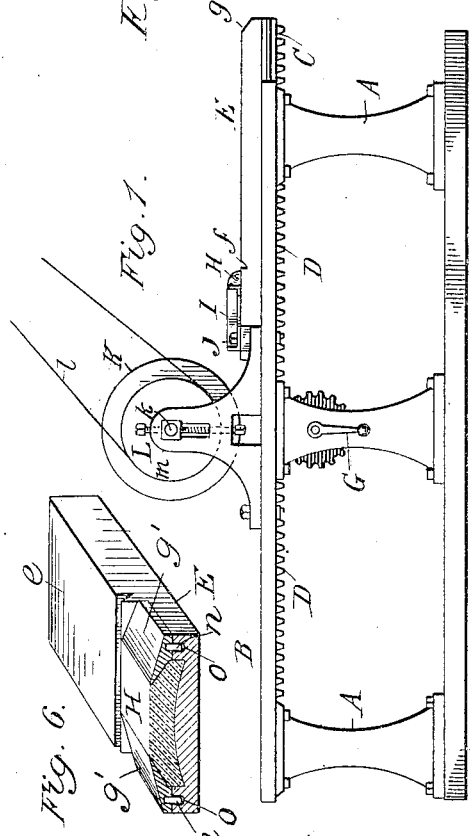
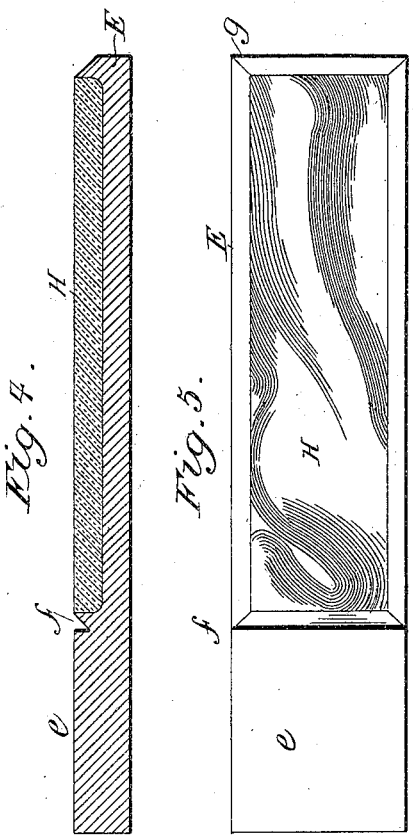
Witnesses
Edward C. Royland
William H. Mohr
Inventor
William Passmore Meeker,
By his Attorney
Andrew Wilson

UNITED STATES PATENT OFFICE.

WILLIAM PASSMORE MEEKER, OF NEWARK, NEW JERSEY.

APPARATUS FOR MAKING ARTICLES FROM PLASTIC MATERIAL.

No. 807,630.     Specification of Letters Patent.     Patented Dec. 19, 1905.

Application filed April 25, 1904. Serial No. 204,747.

*To all whom it may concern:*

Be it known that I, WILLIAM PASSMORE MEEKER, a citizen of the United States, residing at Newark, New Jersey, have invented certain new and useful Improvements in Apparatus for Making Articles from Plastic Material, of which the following is a specification.

My invention relates to the making of articles from molten or plastic vitreous material, and my improvements are particularly directed to the means by which the plastic material is forced into the mold or die to form the article.

In the drawings, Figure 1 is a side elevation of a machine embodying my improved apparatus. Fig. 2 is an end view of the same looking from right to left on Fig. 1. Fig. 3 is a top view of the mold and guides. Fig. 4 is a longitudinal sectional view, and Fig. 5 is a view of one of my improved molds with the article (a tile) formed therein; and Fig. 6 is a perspective view, partly in section, of a modified form of mold with the article therein.

Similar reference-letters designate similar parts in all the figures.

The frame A of the machine carries a sliding bed C, the flanges $d$ $d$ of which travel in the grooves in the sides of the frame. This sliding bed C is moved backward and forward by means of the gear-wheels E' E', mounted on the shaft E, rotated by the crank G and engaging with the rack-bars D D on the under side of the bed.

Above the bed C is mounted a roller K, carried by journals K K in adjustable bearings M M and driven by means of a belt $l$ and pulley L in the usual manner.

On the sides of the frame A are mounted the guides I I, which are adjustably connected to the frame by means of the set-bolts J J passing up through the slots $i$ $i$ in the guides.

E is the mold, in which is formed a depression of the desired shape of the article, the exterior edges $g$ $g$ of the mold being beveled off, as shown, so as to form an acute angle with the inner sides. This beveled edge is continued across the inner end of the mold, so as to form a groove $f$, beyond which the mold is continued in the form of a flat table $e$, lying on the same level as the edges of the mold.

In Fig. 6 I have shown a modification of the mold wherein the upper edges $g'$ $g'$ are made to overhang the interior of the mold and are detachably held in position by means of pins $n$ $n$ entering sockets $o$ $o$ in the sides of the mold, so that when the article has been molded the edges may be removed in order to release it, and it will be understood that other irregular forms requiring a split or divided mold may be made, so long as the top aperture, through which the material is introduced into the mold, is surrounded by an edge lying in a uniform plane and the top of the article is flat.

The operation of my invention is as follows: A quantity of plastic vitreous material H is placed upon the table $e$ of the mold, preferably by letting it fall in the form of a thick stream, which is piled upon itself in numerous convolutions, so as to distribute the fiber or grain of the mass in numerous directions. The mold E is then placed upon the movable table C, which by means of the crank G and intermediate gearing is fed forward toward the roller K. As the mold is drawn between and beneath the inclined ends $j$ $j$ of the guides I I the mass H is contracted by the guides to at least the width of the interior of the mold, toward and partially into which it is pushed by this operation. The mold is then carried under the revolving roller K, which is adjusted to travel against the upper surface of the table $e$ and the edges $g$ of the mold E, and thereby the mass H is forced into the body of the mold and pressed down therein, so as to evenly fill every part thereof, the operation of the roller K against the upper angular edges $g$ serving to cleanly and evenly cut off any superfluous material which may fall or be forced outside of the mold. This operation of smearing back and rolling down the mass H also insures the complete filling of the forward lower angle of the mold, which could not be satisfactorily accomplished if the material were deposited in the first instance directly in the hollow of the mold and then passed under the roller, for in that case the material will not uniformly and surely fill up the front end of the mold. After the mold has passed under the roller K the mass is allowed to set and is then removed from the mold by turning it over.

The method described of placing the material upon the table $e$ of the mold and smearing and rolling it thence into the mold has also the effect of distributing the mass in a great variety of curves and intersecting lines, thus greatly increasing the beauty and ornamental appearance of the article.

Having thus described my invention, what I claim, and desire to secure by Letters Patent of the United States, is—

1. A mold, for forming articles from plastic material, made in one piece, and provided with a depressed recess therein, and with a preliminary receiving-table, elevated above the bottom of the recess, at the forward end of such mold and integral therewith.

2. A mold, for forming articles from plastic material, provided with an acute-angled upper edge, entirely surrounding such mold, and with a preliminary receiving-table at one end thereof.

3. A mold, for forming articles from plastic material, provided with an acute-angled upper edge and with a preliminary receiving-table at one end thereof.

4. A mold, for forming articles from plastic material, provided with an acute-angled upper edge, and with a preliminary receiving-table at one end thereof, and having a groove or depression between such table and the edge of the mold.

5. The combination, in an apparatus for forming articles from plastic material, of a frame, provided with a support or bed, and with a pressure-roller, and a detached mold provided with a preliminary receiving-table carried upon said support or bed beneath said pressure-roller.

6. The combination, in an apparatus for forming articles from plastic material, of a frame, provided with a sliding bed and with a pressure-roller, mass-guides, and a detached mold having a preliminary receiving-table at the forward end thereof and adapted to be carried by said sliding bed beneath said mass-guides and roller.

7. The combination, in an apparatus for forming articles from plastic material, of a frame, provided with a sliding bed and with a pressure-roller, and a detached mold, having a preliminary receiving-table at the forward end thereof, passing beneath and against said roller.

8. The combination, in an apparatus for forming articles from plastic material, of a frame, provided with a sliding bed and with a pressure-roller, and a detached mold, provided with a preliminary receiving-table at the forward end thereof and with acute-angled upper edges, passing beneath and against said roller.

9. The combination, in an apparatus for forming articles from plastic material, of a frame, provided with a sliding bed and a pressure-roller, adjustable mass-guides, and a detached mold, having a preliminary receiving-table at its forward end, carried by said bed beneath said pressure-roller.

10. The combination, in an apparatus for forming articles from plastic material, of a frame, provided with a sliding bed and a pressure-roller, adjustable mass-guides with inclined ends, and a detached mold, having a preliminary receiving-table at its forward end, and carried by said bed beneath and against said mass-guides and pressure-roller.

WILLIAM PASSMORE MEEKER.

Witnesses:
WM. D. NEILLEY,
WILLIAM H. MOHR.